United States Patent Office 2,826,226
Patented Mar. 11, 1958

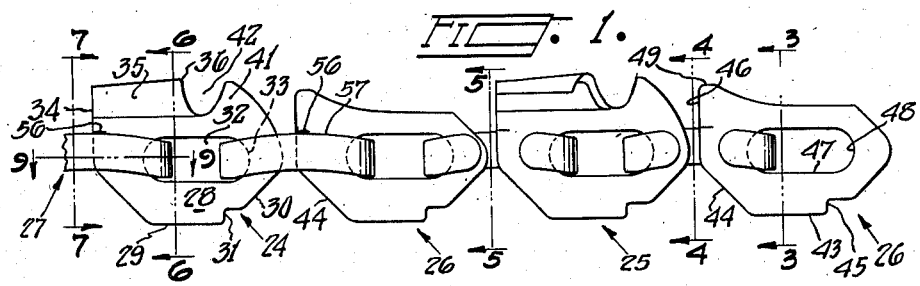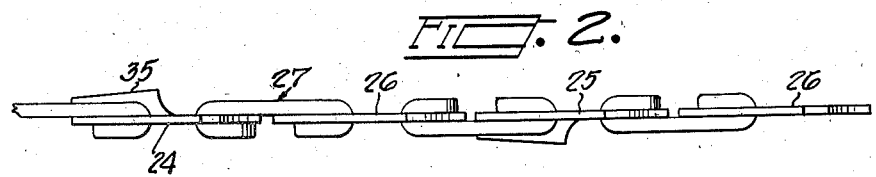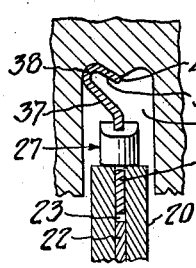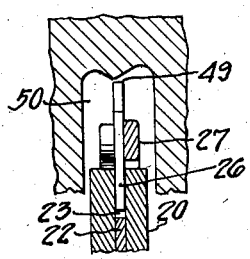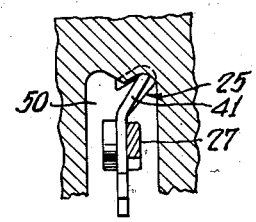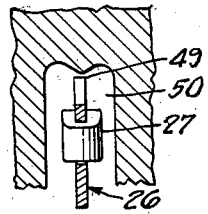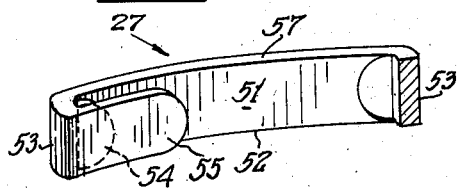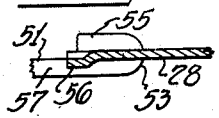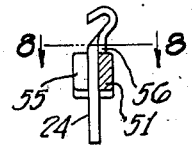

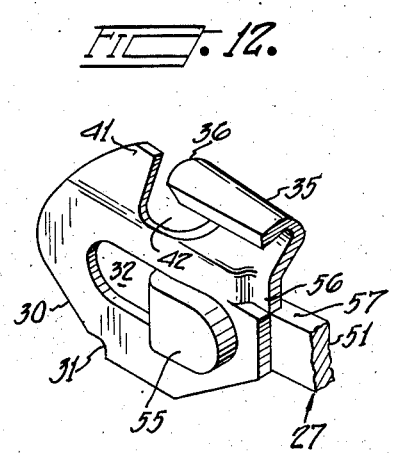
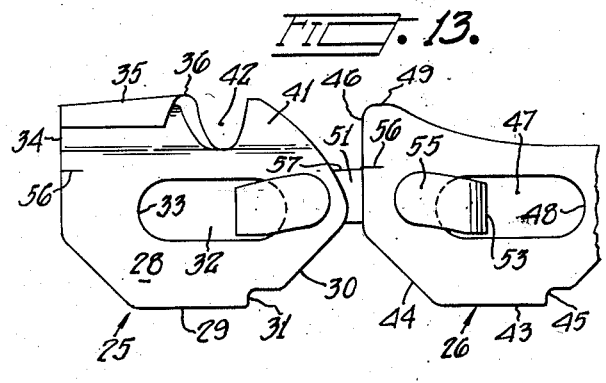
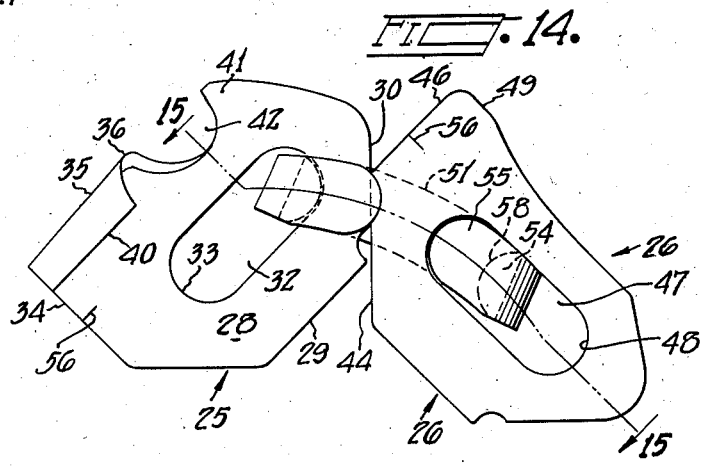
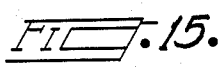
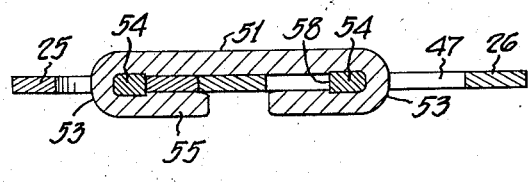
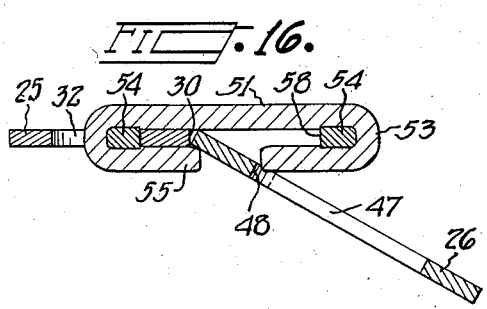
INVENTOR
RICHARD W. DONLEY
ATTORNEY March 11, 1958   R. W. DONLEY   2,826,226
CUTTER CHAIN FOR POWER SAWS
Filed Oct. 8, 1952   3 Sheets-Sheet 3
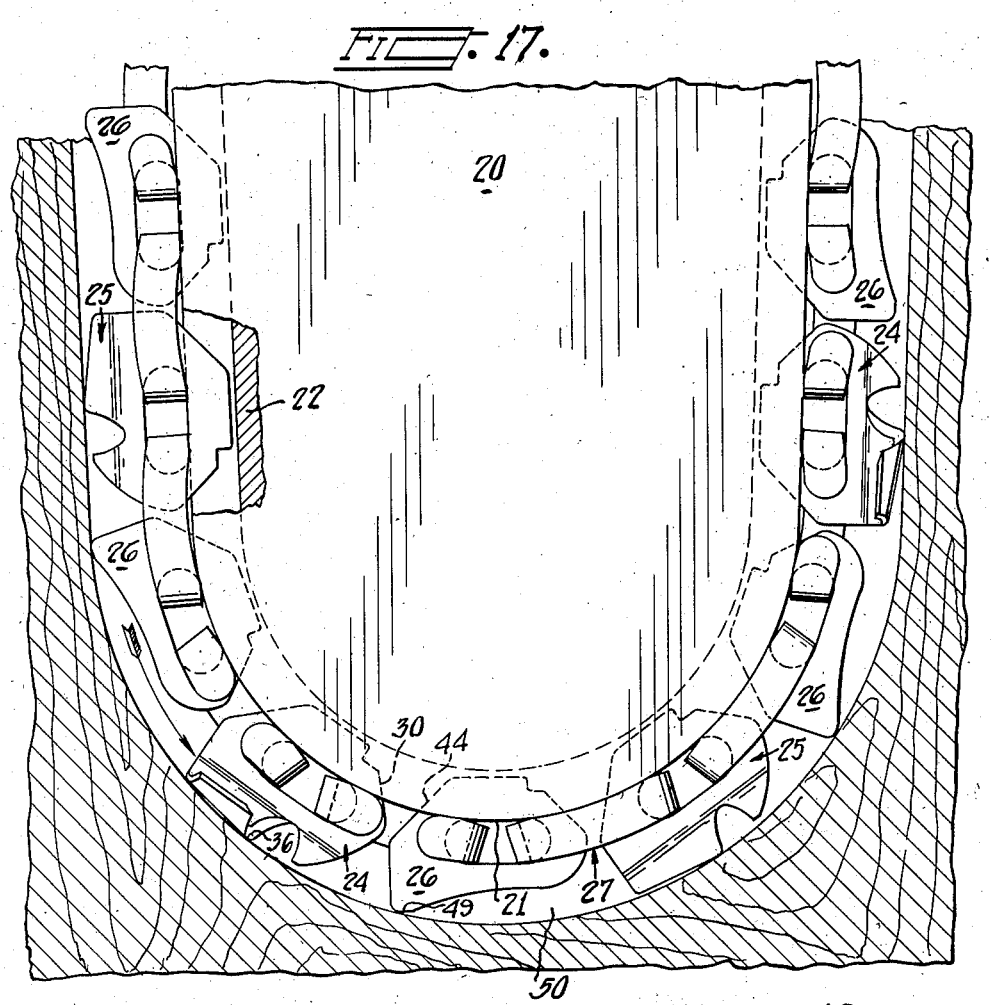
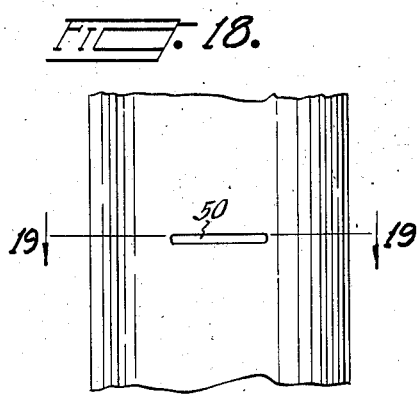
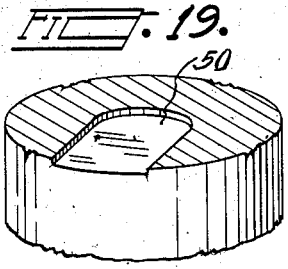
INVENTOR
RICHARD W. DONLEY
BY
ATTORNEY

2,826,226

CUTTER CHAIN FOR POWER SAWS

Richard W. Donley, Boise, Idaho

Application October 8, 1952, Serial No. 313,739

3 Claims. (Cl. 143—135)

This invention relates generally to power saws and particularly to a chain therefor.

The main object of this invention is to provide a power saw chain with which the maximum cutting efficiency can be obtained.

The second object is to reduce the loss of time ordinarily caused by breakdown and to increase the life of the saw chain by providing fast and simple means for replacement of worn or damaged parts.

The third object is to eliminate the need of the conventional rivets and to greatly increase the bearing surfaces of the joints in the chain without weakening the chain and that the chain can be built of lesser height than when rivets are employed.

The fourth object is to construct a saw chain having a combination of links which can be arranged to permit the particular requirements of a good cutting condition.

The fifth object is to produce a chain which will cut efficiently along the straight side of the chain and which can be used for boring by placing the end of the bar around which the chain rotates toward the surface to be sawed and have it feed smoothly in and through the material being sawed.

The sixth object is to produce a saw chain with right and left hand teeth, each of which cuts from the side to the center of the kerf only, and each of which is so curved from the side around the top and down that it entirely cuts and severs a separate shaving from its half of the kerf, thereby accomplishing an improved cutting action with less tooth friction than is present in the conventional L-shaped tooth and thereby producing a non-binding saw chain.

The seventh object is to produce a saw chain whose teeth are so constructed that all of the cutting surface of each tooth attempts to get into the wood so that the chain will feed or bite into the wood of its own action and to do so evenly and uniformly.

The eighth object is to increase the tensile strength of the chain and minimize the hazards normally accompanying the operation of such units.

I accomplish these and other objects in the manner set forth in the following specification as illustrated by the accompanying drawings, in which:

Fig. 1 is a side elevation of a section of chain showing the relation of the tooth links, rider links and the connecting links.

Fig. 2 is a bottom edge elevation of Fig. 1.

Fig. 3 is a fragmentary section taken along the line 3—3 in Fig. 1 through a rider link.

Fig. 4 is a fragmentary section taken along the line 4—4 in Fig. 1 showing a right hand tooth link and its rider link in elevation.

Fig. 5 is a fragmentary section taken along the line 5—5 in Fig. 1 through a connecting link and showing a rider link in elevation.

Fig. 6 is a fragmentary section taken along the line 6—6 in Fig. 1 showing a left hand cutter link in section.

Fig. 7 is a section taken along the line 7—7 in Fig. 1 showing a cutter link from its leading edge.

Fig. 8 is a section taken along the line 8—8 in Fig. 7.

Fig. 9 is a section taken along the line 9—9 in Fig. 1.

Fig. 10 is a perspective view of a connecting link with a portion broken away in section and with one bearing insert removed.

Fig. 11 is a perspective view of a bearing insert.

Fig. 12 is a perspective view of a cutter link and a fragment of a connecting link.

Fig. 13 is an enlarged side elevation of a set of three links; namely, a cutter link, a rider link and a connecting link in straight line position.

Fig. 14 is a view similar to Fig. 13 but showing the saw parts moved to a connecting or disconnecting position.

Fig. 15 is a broken section taken along the line 15—15 in Fig. 14.

Fig. 16 is a view similar to Fig. 15 but showing the parts in position for connecting or disconnecting.

Fig. 17 is a fragmentary side elevation of the end of a saw bar showing in section a portion of a log or tree into which the saw is boring.

Fig. 18 is a fragmentary portion of a tree showing the kerf which can be formed in the tree by this saw.

Fig. 19 is a fragmentary view of the tree with a portion cut away along the line 19—19 in Fig. 18 showing the type of kerf which can be formed with this saw.

Like numbers of reference refer to the same or similar parts throughout the several views.

Referring in detail to the drawing there is shown a saw bar 20 having a rounded end 21, preferably formed of two plates and divided by a spacer 22 which forms the bottom of a groove 23, which forms a raceway around the perimeter of the bar 20. These are common on all power chain saws. Since the invention in this case resides in the chain and not in the means for driving it, the special attention will be directed to the chain itself.

The chain consists of four different links, a left hand cutter link 24, a right hand cutter link 25, a rider link 26, and a connecting link 27. The links 24 and 25 are identical except that one is right hand and one is left hand, and therefore only one will be described.

The cutter link 24 is comprised of an elongated body 28 having a straight side 29 which rides near the bottom of the groove 23 and having an inclined front edge 30 allowing clearance for the links on the turns. A cleaning notch 31 is also indicated. It acts as a cleanout for the groove 23.

Along the length of the body 28 is formed an elongated slot 32 having rounded ends 33. The trailing edge 34 is normal to the side 29.

A right hand cutter tooth 35 extends from the edge 34 to the point 36, which is approximately the middle of the length of the link 24.

While the tooth 35 may assume different shapes, I prefer the shape shown in Fig. 6, in which a portion 37 is straight and inclined slightly with relation to the plane of the body 28, while the portion 38 is rounded and inwardly and downwardly turned along the straight blade portion 39 whose edge 40 extends slightly past the median plane of the body 28.

In front of the cutter tooth 35 and integral with the body 28 is a rider lug or shoe 41, which is separated from the cutter tooth 35 by a rounded notch 42.

Preceding the link 24 and in the same plane therewith is the rider link 26 having the straight edge 43, the inclined edge 44, the notch 45 and the trailing end 46, which is normal to the edge 43; that is, this portion of the shape is the same as in the link 24.

The link 26 also has an elongated slot 47 with the rounded ends 48. The trailing end 46 extends outwardly to form a rider lug or shoe 49 which functions as a depth gauge at the trailing end of the link 26 just as the lug 41 functions as a depth gauge at the leading end of the link 24 when the saw is cutting as shown in Fig. 17; that is, boring into the log, while on the straight-away cutting the riders 49 ride free of the kerf 50.

Connecting the links 24 and 26, as well as the links 26 and 25 are the connecting links 27 shown in detail in Figs. 9–15, inclusive.

It will be noted that the link 27 is comprised of an arcuate side member 51, whose innermost edge 52 is curved to conform with the outer edge 21 of the bar 20, while its ends 53 are turned downwardly and fitted with a hardened insert 54, which is folded into the metal by pressure as shown in Fig. 9, the ends 55 being spaced from the side 51 sufficiently far to receive the links 24, 25 or 26.

Turning to Figs. 13–16, inclusive, it will be noted that, when the parts are turned to the position in Fig. 14, the link 26 can be put into place or withdrawn by swinging it laterally as shown in Fig. 16.

It will be noted that each of the links 24, 25 and 26, both right and left handed, are each provided with an offset 56 forming a shoulder which rests upon the rounded edges 57 of the connecting links 27.

It can be seen by an inspection of the drawing that assembling of the chain merely requires arrangement of the parts shown in Fig. 15 and, when once assembled and stretched in endless form around the bar 20, it cannot possibly become separated.

It will also be noted that the wearing surface around the rounded edge 58 of the insert 54 is many times greater than the corresponding wearing surface on the rivets commonly employed to unite chains of this character.

It can be seen from an inspection of the drawing that in the operation of this chain, the right and left hand links each cut from the side to the center of the kerf only and the tooth is so curved that it entirely cuts and severs a separate shaving from its half of the kerf only, thereby greatly reducing the amount of tooth friction, which forms a large portion of the load on existing power saws.

As previously stated, the chain may be coupled as illustrated in the drawing with the rider link between two cutter links, or they may be otherwise arranged, but the arrangement herein illustrated is best adapted for all ordinary purposes.

I claim:

1. A saw chain comprising alternate right and left cutter links and intervening rider links, all of said links having flat plate body portions with connecting link apertures, depth gauge rider lugs on the leading ends of said cutter links and on the trailing ends of said rider links, the rider lugs on the rider links being lower than the rider lugs on the cutter links, and flat hook end connecting links of less height than said body portions engaged in said apertures and forming quick detachable connectors between said cutter and rider links.

2. A saw chain as defined in claim 1 wherein the connecting links in the right cutter links are disposed on the opposite side of the chain from the connecting links in the left cutter links, each rider link having a connecting link on each side thereof.

3. In a chain saw having a flat saw bar with a rounded boring end and an edge groove forming a raceway for the saw chain extending around said rounded end, a saw chain comprising alternate cutter links and rider links adapted to travel in said groove, connecting links having leading and trailing pivotal connections with said cutter and rider links, a depth gauge rider lug on the leading end of each cutter link at approximately the same longitudinal position on said cutter link as said leading pivotal connection, and a depth gauge rider lug on the trailing end of each rider link of less height than said rider lugs on the cutter links and positioned to the rear of the trailing pivotal connection on the rider link for projection to a greater height than the rider lugs on the cutter links in passing around said rounded end of the saw bar, whereby only the rider lugs on the cutter links are effective as a depth gauge along a side of the saw bar in a straight cut and only the rider lugs on the rider links are effective as a depth gauge around the boring end of the saw bar in a boring cut.

References Cited in the file of this patent

UNITED STATES PATENTS

| | | |
|---|---|---|
| 518,646 | Hall et al. | Apr. 24, 1894 |
| 532,705 | Ritscher | Jan. 15, 1895 |
| 619,888 | Higgins | Feb. 21, 1899 |
| 895,727 | Clouser | Aug. 11, 1908 |
| 958,676 | Dodge | May 17, 1910 |
| 992,656 | Harms | May 16, 1911 |
| 1,064,865 | Spielman | June 17, 1913 |
| 1,779,083 | Bens | Oct. 21, 1930 |
| 1,979,001 | Kankos | Oct. 30, 1934 |
| 2,508,784 | Cox | May 23, 1950 |
| 2,515,550 | Ciba | July 18, 1950 |
| 2,622,636 | Cox | Dec. 23, 1952 |
| 2,774,396 | Gommel | Dec. 18, 1956 |

FOREIGN PATENTS

| | | |
|---|---|---|
| 44,344 | Netherlands | Oct. 15, 1938 |
| 272,660 | Switzerland | Apr. 2, 1951 |